(12) United States Patent
Humphreys et al.

(10) Patent No.: US 7,545,140 B2
(45) Date of Patent: Jun. 9, 2009

(54) METAL OBJECT DETECTING APPARATUS

(75) Inventors: Richard G Humphreys, Malvern (GB); Mark N Keene, Malvern (GB)

(73) Assignee: QinetiQ Limited, London (GB)

( * ) Notice: Subject to any disclaimer, the term of this patent is extended or adjusted under 35 U.S.C. 154(b) by 237 days.

(21) Appl. No.: 11/808,919

(22) Filed: Jun. 13, 2007

(65) Prior Publication Data

US 2008/0054893 A1    Mar. 6, 2008

(30) Foreign Application Priority Data

Sep. 1, 2006    (GB)    ................... 0617177.1

(51) Int. Cl.
*G01N 27/72*    (2006.01)
*G01R 33/12*    (2006.01)
*G08B 13/24*    (2006.01)

(52) U.S. Cl. ................ 324/243; 340/551; 324/247

(58) Field of Classification Search ............. 324/243, 324/247; 340/551, 572
See application file for complete search history.

(56) References Cited

U.S. PATENT DOCUMENTS

| | | | |
|---|---|---|---|
| 3,758,849 A | 9/1973 | Susman et al. | |
| 3,950,696 A | 4/1976 | Miller et al. | |
| 4,605,898 A | 8/1986 | Aittoniemi et al. | |
| 4,906,973 A | 3/1990 | Karbowski et al. | |
| 5,121,105 A | 6/1992 | Aittoniemi | |
| 5,498,959 A * | 3/1996 | Manneschi | 324/243 |
| 5,642,045 A | 6/1997 | Keefe et al. | |
| 5,842,986 A | 12/1998 | Avrin et al. | |
| 6,204,667 B1 | 3/2001 | Won | |
| 6,541,966 B1 * | 4/2003 | Keene | 324/243 |
| 7,030,759 B2 | 4/2006 | Nelson | |

FOREIGN PATENT DOCUMENTS

| | | |
|---|---|---|
| FR | 2 530 037 | 1/1984 |
| GB | 2 357 853 | 1/2003 |
| WO | 97/49334 | 12/1997 |
| WO | 00/00848 | 1/2000 |

OTHER PUBLICATIONS

UK Search Report for GB 0617177.1, date of search Jan. 5, 2007.
Perry et al., "Innovations in weapons detector portal technology," Sensors, and Command, Control, Communications, and Intelligence (C3I) Technologies for Homeland Defense and Law Enforcement II, Proceedings of SPIE, vol. 5071, 2003, pp. 362-371.

* cited by examiner

*Primary Examiner*—Jay M Patidar
(74) *Attorney, Agent, or Firm*—Nixon & Vanderhye P.C.

(57) ABSTRACT

A metal object detecting apparatus comprising, a transmitter for generating a primary magnetic field having a resultant magnetic field direction which varies along any substantially linear path through a surveillance volume such that at three locations along said path the resultant magnetic field points in three mutually substantially orthogonal directions; a detector for measuring a secondary magnetic field at a plurality of positions as a function of time due to the presence of a metal object within the surveillance volume as it passes a plurality of measurement points there-through; and a processor for determining from the measured secondary magnetic fields a track through the surveillance volume comprising a plurality of locations of the metal object and a magnetic moment thereof at each location, the processor being adapted in use to derive there-from a magnetic signature that is characteristic of the metal object and independent of the orientation and track of the metal object.

50 Claims, 5 Drawing Sheets

| 9,1 | 9,2 | 9,3 |
|-----|-----|-----|
| 8,1 | 8,2 | 8,3 |
| 7,1 | 7,2 | 7,3 |
| 6,1 | 6,2 | 6,3 |
| 5,1 | 5,2 | 5,3 |
| 4,1 | 4,2 | 4,3 |
| 3,1 | 3,2 | 3,3 |
| 2,1 | 2,2 | 2,3 |
| 1,1 | 1,2 | 1,3 |

Fig. 5

METAL OBJECT DETECTING APPARATUS

BACKGROUND OF THE INVENTION

1. Field of the Invention

The present invention relates to a metal object detecting apparatus and to a method of detecting a metal object. The invention relates specifically, but not exclusively, to an apparatus for locating, classifying and identifying metal objects carried on a person and to a corresponding method.

2. Description of the Related Art

Metal detectors are used extensively in security critical applications for detecting concealed weapons, for example knives and guns. Such security metal detectors typically comprise a surveillance zone defined by a walk-through archway or portal within which magnetic fields are monitored. A characteristic magnetic field within the surveillance zone is indicative of the presence of a metal object within said area. Passive security metal detectors measure disturbances in the earth's magnetic field due to movement of ferrous metal objects therein, see for example U.S. Pat. No. 6,133,829. Alternatively, active metal detectors transmit a primary, time-dependent magnetic field within the surveillance zone and measure secondary magnetic fields arising from eddy currents induced in any metal object within a zone of influence of the primary magnetic field. Active metal detectors fall broadly into two categories; namely pulse-induction (p.i.) detectors which utilise a transient magnetic field, and continuous wave (c.w.) detectors which use an alternating (sinusoidal) magnetic field.

At their simplest, security metal detectors merely provide an indication of the absence or presence of a metal object within the surveillance zone by comparing the magnitude of the measured magnetic field against a threshold set by the user. In the event that a metal object is detected, the person being screened may have to undergo a thorough search in order to determine the location of the metal object on the person.

More sophisticated security metal detectors are capable of providing an approximate indication of the location of a metal object within the surveillance zone, for example using several transmit and receive coils arranged in zones as described in U.S. Pat. No. 5,859,532.

However, there is an increasing requirement for security metal detectors to be able to provide some form of discrimination between threat items (knives, guns etc.) and non-threat items such a personal electronic devices. A small object can be characterised by its magnetic polarizability tensor (L D Landau and E M Lifschitz, "Electrodynamics of Continuous Media" Pergamon Press, 1960 p. 192) for a given illuminating field frequency (for c.w.) or time delay (p.i.). The polarizability tensor of an object when referred to the frame of reference given by its principal axes is a unique property of that object and can be used to classify or identify it. We will refer to all or part of the magnetic polarizability tensor, or its generalisation for large targets, measured at one or more frequencies (c.w.) or time delays (p.i.) as the magnetic signature of the object.

In order to determine the magnetic signature of an object it is necessary to measure its response to a known magnetic field applied in three linearly independent, preferably substantially orthogonal, directions. Because magnetic field lines are curved, to do this over an extended region of space it is necessary to be able to locate the target in three dimensions. The provision of precise location information and effective discrimination provides benefits in terms of reducing nuisance alarm rates, enabling operators to rapidly resolve potential threats, and even offers the prospect of detection systems having remote supervision or autonomous systems which function without an operator.

International Patent Application Publication No. WO 00/00848 describes an advanced method for locating a metal object within a surveillance zone based on an approximation that the metal object behaves as an oscillating dipole source. The metal detector described in WO 00/00848 measures magnetic field gradients within the surveillance zone and applies an inversion algorithm to said gradients in order to estimate of the location of the dipole source within the surveillance zone.

WO 00/00848 also offers a useful level of discrimination between threat and non-threat items by providing an indication of the magnetic signature of a detected metal object. However, the system described in WO 00/00848 cannot be guaranteed to classify or identify metal objects at substantially all points within the surveillance volume, but is intended to be moved by the user so that a reliable signature can be measured. The system described in WO 00/00848 is not therefore optimised for use in a security metal detector portal.

An alternative approach to precisely locating a single ferromagnetic object in a portal is reported by Perry et al. Proc. SPIE 5071, 362 (2003). However, this approach is incapable of detecting non-ferromagnetic objects or multiple objects, and characterises an object (approximately) only in terms of its permanent magnetic moment. This quantity will vary from object to object, even for nominally identical objects, and offers no prospect of classifying or identifying the object.

Accordingly, it is an object of the invention to provide a metal object detecting apparatus and a method of detecting a metal object which mitigate at least some of the disadvantages of the conventional metal detectors and detection methods described above. It is a further object of the invention to provide an improved apparatus and method for locating, classifying and identifying metal objects.

BRIEF SUMMARY OF THE INVENTION

According to a first aspect of the present invention, there is now proposed a metal object detecting apparatus comprising, (i) transmitter means for generating a time varying primary magnetic field within a surveillance volume, the magnetic field having a non-zero magnitude throughout substantially all of the surveillance volume and a resultant magnetic field direction which varies along any substantially linear path through the surveillance volume such that at three locations along said path the resultant magnetic field points in three mutually substantially orthogonal directions, (ii) detection means for measuring a secondary magnetic field at a plurality of positions as a function of time due to the presence of a metal object within the surveillance volume as it passes a plurality of measurement points there-through, the detection means being arranged to substantially reject the primary magnetic field, and (iii) processing means for determining from the measured secondary magnetic fields a track through the surveillance volume comprising a plurality of locations of the metal object within the surveillance volume and a magnetic moment thereof at each location, the processing means being adapted in use to derive there-from a magnetic signature that is characteristic of the metal object and independent of the orientation and track of the metal object through the surveillance volume.

In a preferred embodiment, the processing means is adapted in use to classify the metal object into one of a plurality of classes of metal objects based on said magnetic signature thereof.

In another preferred embodiment, the processing means is adapted in use to identify the metal object from said magnetic signature thereof.

Advantageously, the processing means determines the track of the metal object through the surveillance volume by applying a minimisation algorithm to the secondary magnetic fields measured by the detection means.

Preferably, the processing means applies the minimisation algorithm to the secondary magnetic field measurements for each measurement point in sequence to provide the location of the metal object in three-dimensions and the magnetic moment there-at, and orders said locations and magnetic moments to give the track of the metal object and the magnetic moment as a function of position along the track.

Alternatively, the processing means stores the secondary magnetic field measurements for each measurement point, subsequently applies the minimisation algorithm to the stored secondary magnetic field measurements to provide the location of the metal object in three-dimensions and the magnetic moment there-at, and orders said locations and magnetic moments to give the track of the metal object and the magnetic moment as a function of position along the track. In a preferred embodiment, the processing means orders the stored secondary magnetic field measurements into a time series before applying the minimisation algorithm.

Preferably, in use the processing means calculates the magnetic polarizability tensor for the metal object from the magnetic moment determined at each location along the track through the surveillance volume.

Preferably, in use the processing means calculates eigenvalues of the magnetic polarizability tensor for the metal object. Where the metal object detecting apparatus comprises a continuous wave system, the processing means operates in the frequency domain and preferably calculates eigenvalues of at least one of the real and imaginary parts of the complex magnetic polarizability tensor of the metal object. Alternatively, where the metal object detecting apparatus comprises a pulse-induction system, the processing means operates in the time domain and preferably calculates eigenvalues of the magnetic polarizability tensor for the metal object after one or more time delays from a transmit pulse.

In a preferred embodiment, the processing means compares the eigenvalues calculated for the metal object to a database comprising eigenvalues of a plurality of objects arranged into a plurality of predetermined classes, so as to classify the metal object into one of said plurality of predetermined classes of objects. Advantageously, the processing means produces a classification output indicative of a class of objects to which the metal object belongs in the event that the calculated eigenvalue substantially matches an eigenvalue within the database.

Alternatively, or in addition, the processing means preferably compares the eigenvalues calculated for the metal object to a database comprising eigenvalues of a plurality of objects and associated identities there-of, so as to identify the metal object from the calculated eigenvalue. Advantageously, the processing means produces an identification output indicative of the identity of the metal object in the event that the calculated eigenvalue substantially matches an eigenvalue within the database.

Preferably, the transmitter means comprise at least one transmitter coil array having a plurality of transmitter coils arranged symmetrically therein. Alternatively, or in addition, the transmitter means may include a multi-pole coil comprising a complex, single coil configuration.

Even more preferably, the transmitter coil array has twofold rotational symmetry about a central axis thereof. The at least one transmitter coil array may comprise a plurality of substantially rectangular coils disposed in a regular arrangement with neighbouring sides of adjacent coils being substantially parallel.

In a preferred embodiment, the magnitude of the time varying primary magnetic field within the surveillance volume varies in use substantially sinusoidally with time. In such a preferred embodiment, the at least one transmitter coil array may be driven by an a.c. current which varies substantially sinusoidally with time. The a.c. current may comprise substantially a single frequency, alternatively a plurality of different frequencies.

In another preferred embodiment, in use the time varying primary magnetic field within the surveillance volume comprises a pulsed magnetic field. In such an embodiment, the at least one transmitter coil array is driven by a current comprising a sequence of pulses.

In a preferred embodiment, the detection means comprises at least one detector array having a plurality of magnetic sensors, each magnetic sensor having a measurement axis sensitive to a vector component of the secondary magnetic field along said measurement axis.

Preferably, each of the magnetic sensors is arranged within the at least one detector array with its measurement axis aligned in one of three mutually substantially orthogonal directions.

Conveniently, the magnetic sensors are orientated such that their measurement axis is perpendicular to the primary magnetic field.

Advantageously, the magnetic sensors comprise any of a coil, a fluxgate, a magneto-resistive device, magneto-impedance device, and a Hall effect sensor.

In a preferred embodiment, the magnetic sensors comprise a plurality of coil pairs, the coils comprising each coil pair being connected together electrically and arranged symmetrically each with respect to the other within the at least one detector array. Where the transmitter means comprise at least one transmitter coil array having a plurality of transmitter coils arranged symmetrically therein, the coils comprising each sensor coil pair are arranged each with respect to the other within the detector array with the same symmetry as that with which the plurality of transmitter coils are arranged within the transmitter coil array. In one such embodiment, the detector array may have twofold rotational symmetry about a central axis thereof. Preferably, the transmitter coil array and the detector array have a common axis of rotational symmetry.

Preferably, the coils comprising each coil pair are connected together electrically in series with either the opposite polarity or the same polarity so as to be substantially insensitive to the primary magnetic field.

Conveniently, a correction is applied to an output of the detection means during use such that said output is substantially zero in the absence of a metal object within the surveillance volume.

Advantageously, the metal object detecting apparatus is adapted in use to separate the real and imaginary components of the measured secondary magnetic fields with respect to the phase of the primary magnetic field.

In another embodiment, the metal object detecting apparatus comprises an imager arranged in use to provide an image of the surveillance volume including any occupant there-of. In this embodiment, the metal object detecting apparatus includes a display device configured to display a composite image comprising the image of the surveillance volume and the location of the metal object or objects within the surveillance volume, so as to provide a visual indication of the location of the metal object with respect to any occupant of the surveillance volume.

Preferably, the metal object detecting apparatus comprises means for indicating the class within which the metal object has been classified. Even more preferably, the metal object detecting apparatus includes at least one of a visual and an audible warning device operable by the processing means conditional on the metal object being classified into a predetermined class of objects.

Advantageously, the metal object detecting apparatus includes at least one of a visual and an audible warning device operable by the processing means conditional on the metal object being identified by the processing means.

Conveniently, the processing means is capable of determining from the measured secondary magnetic field the track of each of a plurality of metal objects passing simultaneously through the surveillance volume.

Preferably, the metal object detecting apparatus is adapted to classify a plurality of metal objects substantially simultaneously. Even more preferably, the metal object detecting apparatus is adapted to identify a plurality of metal objects substantially simultaneously.

According to a second aspect of the present invention, there is now proposed a metal object detecting portal comprising a metal detecting apparatus according to the first aspect of the present invention.

According to a third aspect of the present invention, there is now proposed a method of detecting a metal object within a surveillance volume comprising the steps of:

(i) generating a time varying primary magnetic field within the surveillance volume, the magnetic field being arranged to have a non-zero magnitude throughout substantially all of the surveillance volume and a resultant magnetic field direction which varies along any substantially linear path through the surveillance volume such that at three locations along said path the resultant magnetic field points in three mutually substantially orthogonal directions, (ii) measuring a secondary magnetic field at a plurality of positions as a function of time due to the presence of a metal object within the surveillance volume as it passes a plurality of measurement points there-through, (iii) determining from the measured secondary magnetic field a track through the surveillance volume comprising a plurality of locations of the metal object within the surveillance volume and a magnetic moment thereof at each location, (iv) deriving from the plurality of locations of the metal object within the surveillance volume and the magnetic moment thereof at each location a magnetic signature that is characteristic of the metal object and independent of the orientation and track of the metal object through the surveillance volume.

Preferably, the method comprises the further step of classifying the metal object into one of a plurality of classes of metal objects based on said magnetic signature thereof.

Even more preferably, the method comprises the further step of identifying the metal object from said magnetic signature thereof.

In a preferred embodiment, the step of determining the track of the metal object through the surveillance volume comprises the step of applying a minimisation algorithm to the measured secondary magnetic fields measured by the detection means.

Preferably, the minimisation algorithm is applied to the secondary magnetic field measurements for each measurement point in sequence to provide the location of the metal object in three-dimensions and the magnetic moment thereat, and said locations and magnetic moments are ordered to give the track of the metal object and the magnetic moment as a function of position along the track.

Alternatively, the secondary magnetic field measurements for each measurement point are stored, the minimisation algorithm is subsequently applied to the stored secondary magnetic field measurements to provide the location of the metal object in three-dimensions and the magnetic moment there-at, and said locations and magnetic moments are ordered to give the track of the metal object and the magnetic moment as a function of position along the track. In a preferred embodiment, the processing means orders the stored secondary magnetic field measurements into a time series before applying the minimisation algorithm.

Preferably, the method comprises the step of calculating the magnetic polarizability tensor for the metal object from the magnetic moment determined at each location along the track through the surveillance volume.

Advantageously the method comprises the step of calculating eigenvalues of the magnetic polarizability tensor for the metal object. Where the metal object detecting apparatus comprises a continuous wave system, the processing means operates in the frequency domain and preferably calculates eigenvalues of at least one of the real and imaginary parts of the complex magnetic polarizability tensor of the metal object. Alternatively, where the metal object detecting apparatus comprises a pulse-induction system, the processing means operates in the time domain and preferably calculates eigenvalues of the magnetic polarizability tensor for the metal object after one or more time delays from a transmit pulse.

In a preferred embodiment, the method comprises the step of comparing the eigenvalues calculated for the metal object to a database comprising eigenvalues of a plurality of objects arranged into a plurality of predetermined classes, so as to classify the metal object into one of said plurality of predetermined classes of objects. Advantageously, the method comprises the step of producing a classification output indicative of a class of objects to which the metal object belongs in the event that the calculated eigenvalue substantially matches an eigenvalue within the database.

Alternatively, or in addition, the method comprises the step of comparing the eigenvalues calculated for the metal object to a database comprising eigenvalues of a plurality of objects and associated identities there-of, so as to identify the metal object from the calculated eigenvalue. Advantageously, the method comprises the step of producing an identification output indicative of the identity of the metal object in the event that the calculated eigenvalue substantially matches an eigenvalue within the database.

In a preferred embodiment, the method comprises the step of separating the real and imaginary components of the measured secondary magnetic fields with respect to the phase of the primary magnetic field.

In another embodiment, the method comprises the further step of taking an image of the surveillance volume including any occupant there-of. In this embodiment, the method includes the step of displaying a composite image comprising the image of the surveillance volume and the location of the metal object or objects within the surveillance volume, so as to provide a visual indication of the location of the metal object with respect to any occupant of the surveillance volume.

Preferably, the method comprises the step of providing at least one of a visual and an audible warning conditional on the metal object being classified into a predetermined class of objects.

Conveniently, the method comprises the step of providing at least one of a visual and an audible warning conditional on the metal object being identified.

Advantageously, the method comprises the step of determining from the measured secondary magnetic fields the track of each of a plurality of metal objects passing simultaneously through the surveillance volume.

Preferably, the method comprises the step of classifying a plurality of metal objects substantially simultaneously.

Even more preferably, the method comprises the step of identifying a plurality of metal objects substantially simultaneously.

According to another aspect of the present invention, there is now proposed a method of indicating the presence of a predetermined metal object within a plurality of metal objects detected on a person comprising the steps of;

(i) determining a magnetic signature characteristic of each detected metal object, (ii) comparing the magnetic signature of each detected metal object with a magnetic signature of at least one predetermined metal object, (iii) providing an indication of the presence of a predetermined metal object on the person in the event that the magnetic signature of one of the plurality of detected metal objects substantially matches the magnetic signature of the at least one predetermined metal object.

Preferably, the method comprises the step of comparing the magnetic signature of each detected metal object with the magnetic signatures of a plurality of predetermined objects arranged into plurality of predetermined classes of objects, and providing an indication of a predetermined class of objects to which the detected metal object belongs in the event that the magnetic signature of one of the plurality of detected metal objects substantially matches the magnetic signature of one of the plurality of predetermined metal object.

Even more preferably, the method comprises the step of comparing the magnetic signature of each detected metal object with the magnetic signatures of a plurality of predetermined objects having identities associated there-with, and providing an indication of the identity of the detected metal object in the event that the magnetic signature of one of the plurality of detected metal objects substantially matches the magnetic signature of one of the plurality of predetermined metal object.

According to a further aspect of the invention, there is now proposed a method of indicating the presence of a predetermined metal object on a person without divestment of metal objects on said person comprising the steps of;

(i) detecting at least one metal object on said person, (ii) determining a magnetic signature characteristic of the at least one detected metal object, (iii) comparing the magnetic signature of the at least one detected metal object with a magnetic signature of at least one predetermined metal object, (iv) providing an indication of the presence of a predetermined metal object on the person in the event that the magnetic signature of the at least one detected metal objects substantially matches the magnetic signature of the at least one predetermined metal object.

BRIEF DESCRIPTION OF THE SEVERAL VIEWS OF THE DRAWINGS

The invention will now be described, by example only, with reference to the accompanying drawings in which;

FIGS. 4a and 4b are plotted for the same value of x and values of z related by symmetry. The symmetry of the fields is evident. Values at +y in FIG. 4a are equal in magnitude to those at −y in FIG. 4b. The sign of the field in FIG. 4a is the same as that in FIG. 4b for $H_x$, and the signs are reversed for $H_y$ and $H_z$.

FIG. 5 shows a schematic illustration of the receive coils of the metal detecting apparatus of FIG. 2.

DETAILED DESCRIPTION OF THE INVENTION

Figure 1:
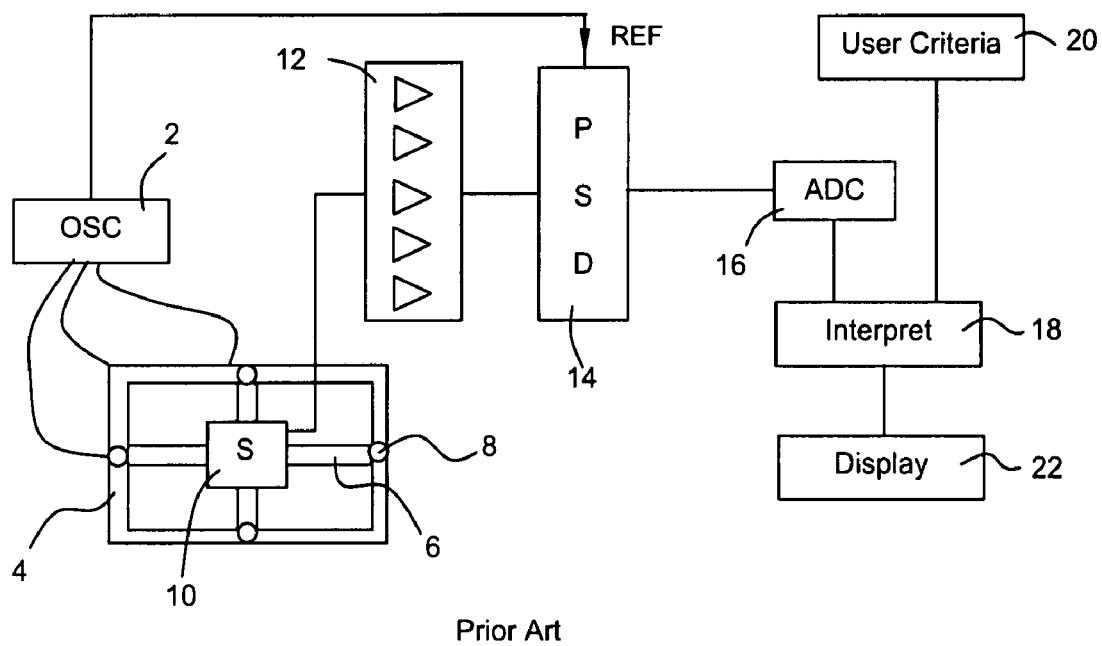
FIG. 1 shows a schematic diagram of a metal locating apparatus described in the prior art. Specifically, FIG. 1 relates to a metal locating apparatus described in International Patent Application Publication No. WO 00/00848.

Referring now to the drawings wherein like reference numerals identify corresponding or similar elements throughout the several views, FIG. 1 shows a schematic diagram of a metal locating apparatus described in the prior art. Specifically, FIG. 1 relates to a metal locating apparatus described in International Patent Application Publication No. WO 00/00848, the content of which is incorporated herein by reference thereto.

WO 00/00848 relates to a metal detector that has the ability to locate the position of a metal object in three dimensions and which is capable of quantifying the magnetic signature of a metal object (referred to in WO 00/00848 as the electromagnetic cross section of the metal object). The magnetic signature of a metal object is a function of shape, electrical conductivity, magnetic permeability, orientation of the metal object, and in the case of c.w. magnetic field the frequency of the magnetic field. In the case of a p.i. system, it is a function of the pulse sequence and the time delay.

The metal detector shown in FIG. 1 employs continuous wave (c.w.) operation and utilises multiple transmitter coils 4, 6, 8 arranged in substantially orthogonal directions. The transmitter coils 4, 6, 8 provide a time-dependent magnetic field to illuminate a surveillance zone. Transmitting signals in three orthogonal directions enables an estimate of the approximate shape of the metal in three-dimensions to be deduced. Information on the shape of the metal is of benefit when discriminating against false alarms. The coils 4, 6, 8 are driven from an alternating current (a.c.) source 2. The transmitted fields are single frequency, alternatively multiple frequency and optionally swept in frequency.

The metal detector shown in FIG. 1 comprises magnetic field sensing means 10 for measuring five magnetic field gradient components of at least first order of a secondary magnetic field induced electromagnetically in a metal object within the surveillance zone. In addition to measuring five magnetic field gradient components, the sensing means 10 is arranged to measure one field component of the secondary magnetic field. The number of spatial gradients which need to be measured depends on the particular application. In the example shown in FIG. 1, the metal detector is configured to locate metal objects in a non-conducting media, requiring five gradients and one field component to be measured to locate and characterise the induced source.

Although not shown explicitly in FIG. 1, the magnetic field sensing means 10 typically comprises several gradiometric pairs of receiver coils. Gradiometric pairs of receiver coils (referred to as "gradiometric coils") are coils wound in opposite polarity and usually wired in series so uniform magnetic fields create equal and opposite signals which cancel. Gradiometric coils are insensitive to the amount of magnetic field which is common to both coils in the pair. They are, however, highly sensitive to the differences in field between the coils in the pair. A field difference divided by the distance between the points where the difference is measured is the field gradient (often referred to as the first order gradient). Because gradiometric pairs of coils are insensitive to uniform or common fields, they are therefore largely insensitive to the transmit signals which can be arranged to be the same in both coils of the pair.

One arrangement of gradiometric coil pairs suitable for use in the metal detector of FIG. 1 comprises at least five sets of gradiometric coil pairs, aligned in different orientations, each pair for measuring a different one of the five independent first order magnetic field gradients. Such gradiometric pairs of coils are arranged to measure approximately different gradient components of the secondary field; namely $dBx/dx$, $dBx/dy$, $dBy/dy$, $dBz/dx$ and $dBz/dy$. In practice, a coil in one coil pair may also form part of another coil pair, thereby sharing coils between coil pairs. In addition, one or more components of magnetic field may be measured, to separate the range from the magnitude of the target dipole moment.

In FIG. 1, the transmitter coils 4, 6, 8 surround the gradiometric coils comprising the magnetic field sensing means 10.

The outputs from each of the gradiometric pairs of coils within the field sensing means 10 are amplified by amplifiers 12, one for each gradient measurement, and phase sensitively detected using phase sensitive detectors (PSDs) 14, one for each gradient measurement. The transmitter oscillator 2 provides the reference signal to the PSDs. Phase sensitive detection may be single or dual phase. The purpose of the amplifiers 12 is to boost the voltage across the gradiometric pair to a level suitable for analogue to digital conversion. The purpose of the phase sensitive detectors 14 is to detect the amplitude of the gradient signal at the frequency of the transmitted field which is at some pre-determined phase. Phase sensitive detectors may alternatively be known as lock-in amplifiers, phase-sensitive demodulators, suppressed carrier AM demodulators or synchronous AM demodulators. A dual phase sensitive detector may be used with phases set 90° apart. This will allow the phase of the secondary field to be deduced within the computer processing means without the need for manually adjusting the reference phase.

The outputs from the PSDs 14, which are proportional in amplitude to the gradients, are then passed to analogue to digital converters 16 where they are digitised for further processing by a computer where data inversion and interpretation algorithms 18 operate.

The five gradient signals are "inverted" in a computer algorithm to yield the three-dimensional position of the metal and its magnetic signature.

User criteria are selectable in software 20 and are input to the interpretative software 18 so that specific metal objects may be selected or rejected. Alternatively, or in addition, objects having a known magnetic signature or shape may be positively selected in the software 20. The results may then be displayed on a visual display 22.

WO 00/00848 describes two types of algorithm used to invert the magnetic field gradient signals. The first is referred to as direct inversion, or single point-by-point inversion. This technique directly computes the properties of a dipole source. Details of such techniques may be found on the following references; W. Wynn et al., "Advanced Superconducting gradiometer/magnetometer arrays and a novel signal processing technique, IEEE Trans. Mag. Vol. 11, p 701 (1975), W. M. Wynn, "Inversion of the DC magnetic field and field derivative equations for magnetic and electric current dipoles", Technical report NCSC TR 362-81 (July 1981, Naval Coastal Systems Center, Panama City, Accession no. U23665B).

The second is a multi-parameter fit to the gradient data, such as a routine based on least-squares fitting. Details of multi-parameter fitting routines which may be used may be found in the following references; W. Wynn, "Magnetic dipole localisation using gradient rate tensor measured by a 5-axis magnetic gradiometer with known velocity", SPIE vol. 2496/357-367; T. R. Clem (code R22), "Advances in the magnetic detection and classification of sea mines and unexploded ordinance, Symposium: Technology and the mine problem, Nov. 21, 1996, Naval post-graduate school, Monterey, Calif.

The principle of multi-parameter fitting is that a mathematical model of the target is programmed into the algorithm (in the case of WO 00/00848 it is a dipole model). The algorithm selects an arbitrary starting position, strength and orientation for the "model" dipole and calculates the expected gradients and fields at the receiver. These are then compared with the actual measured gradients and fields. The position, strength and orientation of the model are then adjusted incrementally to find the best fit to the real data by a least-squares-fit method. The position, strength and orientation of the model is the best estimate of the real properties of the target metal.

By way of example, if the detected metal object is small then the secondary field at the detector will behave as a classic oscillating dipole source. The fields and gradients from dipoles are well known and the following information may therefore be deduced from them; (i) the direction to the dipole (2 angles) (ii) the orientation of the dipole (2 angles) and (iii) the strength of the dipole. The strength is a function of the dipole's magnetic moment and the distance between the sensor and dipole. To separate these an extra piece of information is required. For example, this may be one non-zero field component.

From (i) and (iii) above the three dimensional location of small metal objects can be deduced. The dipole strength can now be used to provide discrimination. The deduced magnetic moment of the metal object is a function of the shape, conductivity and permeability of the object as well as the applied field. As the applied field is known at all points in a non-conducting space (and one knows where the dipole is) this function of shape, conductivity and permeability (the magnetic signature) is characteristic of the metal object. This characterisation can provide useful discrimination against false alarms if the user is looking for metals of specific cross sections or shape or to reject metals of specific magnetic signature or shape.

A continuous wave metal detector of this type employing gradiometric coil pairs requires accurate construction in order to eliminate the transmitted primary magnetic field from the measured secondary magnetic field emitted by the metal object.

The main differences between the present invention and the prior art are now described.

While the metal detector described in WO 00/00848 is capable of classifying or identifying a metal object based on the magnetic signature thereof, it can only do so when the target is in a favourable location. It is necessary for the user to position the sensor correctly with respect to the object. Thus the system described in WO 00/00848 cannot be guaranteed to classify or identify metal objects at substantially all points within the surveillance volume. The system described in WO 00/00848 is not therefore optimised for use in a security metal detector portal.

The present metal detecting apparatus and method address an altogether more onerous requirement than that of the detector described in WO 00/00848, namely classifying and identifying a metal object based on the magnetic signature of the object, as it passes through the fixed surveillance volume, independent of the location or orientation of the object. This is particularly important in security magnetic detector applications (portals) for locating, classifying and identifying metal objects carried on a person.

To this end, the present metal detecting apparatus determines the magnetic signature of the metal object independent of orientation of the object and the location of its track through the surveillance volume. In comparison, the system described in WO 00/00848 can only determine the polarizability tensor of a metal object (i.e. the magnetic signature thereof) for favourable locations within the surveillance volume. It achieves this effect in a different way from WO 00/00848.

WO 00/00848 uses multiple transmit coils so that magnetic fields can be applied in three substantially orthogonal field directions in sequence or simultaneously at slightly different frequencies at a single point. Because magnetic fields lines are curved, this cannot be achieved over an extended region of space. Instead the present invention applies fields in different directions at different points in space as the object passes through the surveillance volume. By tracking the object through the surveillance volume its signature can be deduced from its magnetic moment as determined at each of the different points in space within the surveillance volume through which the object has passed. The tracking of targets to achieve this effect is a key inventive feature of the present invention.

To determine the magnetic signature of the object in this way requires a three-dimensional primary transmitted magnetic field which twists in space so that components thereof in three mutually orthogonal axes are all significant at some point along any straight track through the surveillance volume, and that each component of the primary transmitted field should vary differently with position.

Figure 2:
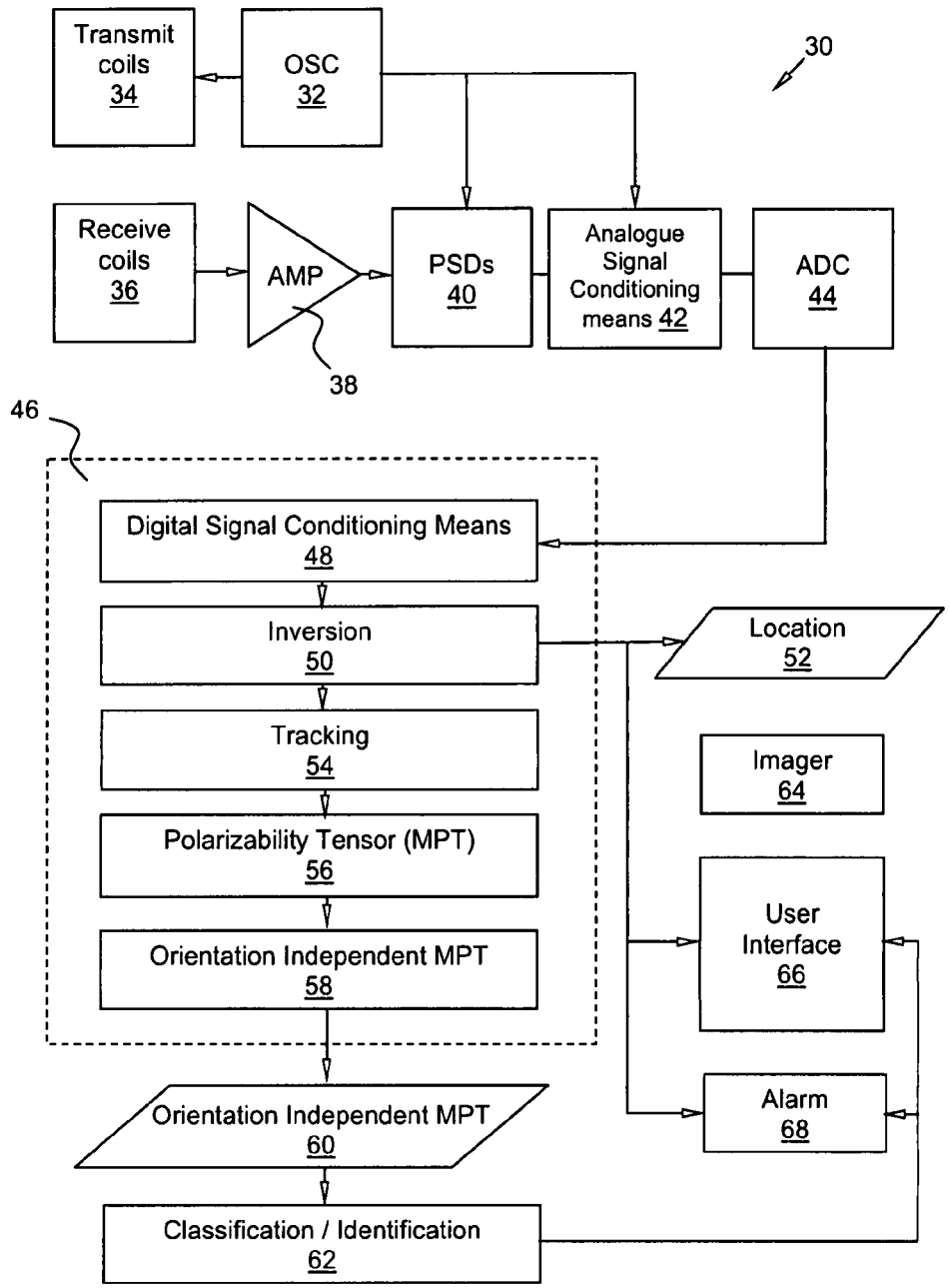
FIG. 2 shows a schematic illustration of a metal object detecting apparatus according to one embodiment of the present invention.

FIG. 2 shows a schematic block diagram of a metal object detecting apparatus 30 according to one embodiment of the present invention. The configuration shown in FIG. 2 comprises a continuous wave system which uses an alternating (sinusoidal) magnetic field. Alternatively, a pulse-induction (p.i.) configuration using a transient magnetic field is used.

Without limitation, the metal object detecting apparatus 30 comprises an archway or portal defining a surveillance zone or volume of space through which a person to be monitored would walk. The portal (not shown in FIG. 2) comprises transmit coils 34 that generate a primary magnetic field within the surveillance volume of the archway that varies in time and space such that a metal object passing through the portal experiences in sequence a time varying magnetic field substantially in three orthogonal directions. The transmit coils 34 are arranged to have some symmetry. Without limitation, the transmit coils 34 typically exhibit twofold rotational symmetry about an axis. The transmit coils 34 are driven by an alternating current source 32 and excited by a single frequency sinusoidal waveform. Optionally, the alternating current source 32 provides a swept frequency sinusoidal waveform to the transmit coils 34, or a stepped frequency sinusoidal waveform. In a further alternative embodiment, the current source 32 provides a drive waveform having multiple frequencies simultaneously within a single transmit coil, to increase the degree to which metal objects are characterised. Alternatively, the current source 32 provides a drive waveform having multiple frequencies simultaneously within different transmit coils, whilst retaining the symmetry of the system.

In principle the same information can be obtained using a pulse induction configuration by transmitting pulses and observing the transient decay of the magnetic moment of a target. The time domain and frequency domain responses are related by a Fourier transform.

By way of example only, conventional metal detecting apparatuses employing time varying magnetic fields typically use magnetic fields which vary in time with frequencies in the range 1-10 kHz, and the present metal object detecting apparatus is no exception. The 1-10 kHz frequency range is typically optimal since the sensitivity of coil based detection systems decreases below about 1 kHz, whereas above 10 kHz dielectric effects associated with the human body within the portal may affect measurements.

The time varying primary magnetic field induces current to flow in any metal object within the surveillance volume, and also a magnetic moment if the material is ferromagnetic. The metal detecting apparatus 30 comprises a receive coil array having a plurality of receive coils 36 arranged to measure the secondary magnetic fields that emanate from metal objects that are within the portal. The receive coils 36 are arranged to substantially reject the transmitted primary field.

The signal from each receive coil 36 is amplified by amplifier 38 and passed to phase sensitive detectors (PSDs) 40 to determine the real and imaginary field amplitude with respect to the phase of the transmitted primary field. In this configuration one PSD is used to determine the real component of the field amplitude and a separate PSD is used to determine the imaginary component of the field amplitude.

The transmit field is typically very much larger than the fields caused by objects, which are the quantities of interest. The receive coils 36 are therefore arranged to reject the applied primary magnetic field by connecting them together in pairs at locations related by the symmetry operation of the transmit coils. The receive coils 36 are connected together in the sense such that the emfs induced in the two receive coils within the pair subtract, thus (to within manufacturing errors) cancelling out the induced voltage due to the applied primary field. Specifically, receive coils 36 whose normal directions are aligned in a transverse direction across the portal are connected together to subtract. Receive coils 36 whose normals are aligned in either a substantially vertical direction, or parallel to the direction of transit through the portal, are configured to sum. The receive coils 36 are typically planar coils, i.e. the coil winding lies substantially in a single plane. Accordingly, the normal direction of the receive coil is the direction normal to the plane in which the coil winding lies.

It is advantageous at this stage to minimise any residual induced voltage due to the transmitted primary field further before digitisation, in order to reduce the dynamic range required of the A/D converter. This can be done by subtracting from the receive signals an adjustable amount of the signal supplied to the transmit coil 34 (and a second wave form out of phase with it) as an analogue voltage. This is performed by analogue signal conditioning means 42.

The resulting signals are digitised by an analogue to digital converter (ADC) 44 and passed to a processor 46.

On receiving the digital data from the ADC 44, the processor 46 applies a filter algorithm to limit the bandwidth and decimates the data to reduce its rate. In practice, the signal from each pair of receive coils 36 consists of a static or slowly drifting voltage due to imperfect cancellation of the offset and a relatively rapidly varying part due to metal objects being carried through the portal. The slowly varying part is isolated by low pass filtering and this is subtracted from the signal, thus adaptively eliminating slow drifts due to thermal expansion or mechanical motion.

The receive coils 36 may also sense objects outside the portal, since the surveillance volume may extend beyond the physical boundaries of the portal. As long as such objects do not move they will also be adapted out by the digital signal conditioning means 48.

The metal detecting apparatus according to the present embodiment uses an inversion algorithm 50 to track the location and the magnetic moment of a plurality of metal objects as they pass through the surveillance volume of the portal.

By way of background, a target within the surveillance volume of the portal is characterised by 9 quantities at any instant: its position (3 coordinates) the real part of its magnetic moment (3 parameters) and the imaginary part of its magnetic moment (3 parameters). Each pair of receive coils 36 produces a real and imaginary output voltage. To locate multiple metal targets it has been established that of the order of 6 receive coil pairs are required to define a target location. This is in accord with the well known argument (W M Wynn, C P Frahm, P J Carroll, R H Clark, J Welihoner and M J Wynn IEEE Trans. Magnetics, vol. MAG-11, no. 2 (1975)) that a remote target can be located from a knowledge of the five independent terms of the magnetic gradient tensor combined with one (non-zero) value of the magnetic field due to the target. The receive coils 36 in the present metal detecting apparatus 30 measure field differences rather than gradients, so this argument does not apply strictly to the present metal detecting apparatus, but nevertheless gives an estimate of the amount of information necessary to characterise a target.

It is well known in the prior art that measurement of five gradients and one field is sufficient to locate a target provided that the range to the target is long compared with the baselines used to determine the gradients. However, it has not previously been recognised that the measurement of six field differences, preferably with baselines comparable to or greater than the range to the target, also yields sufficient information to locate a target. The field differences measured in this way contain information about higher order gradients which allow the range to be separated from the strength of the target. It has also been found experimentally that using more sensors than the theoretical minimum of six leads to more accurate and robust location. In the context of one embodiment of the present invention, coils that are configured to give a sum of fields rather than a difference provide an equivalent amount of information to those that are configured to provide a difference.

Thus it has been estimated that to characterise multiple targets requires at least 6 times as many pairs of receive coils 36 as there are targets.

To determine the location and induced a.c. magnetic moment (hereinafter referred to as the magnetic moment) of a target from the magnetic fields measured at an array of receive coils 36 is an inverse problem. The solution to the forward problem (the calculation of the magnetic fields that would be measured due to a target at a specific location and with a specific magnetic moment) is straightforward and has been outlined above. The inverse problem can be solved by least squares minimisation of the difference between the measured receive coil fields and the field calculated from an assumed target location and magnetic moment.

The processor 46 applies an inversion algorithm 50, using for example a Levenberg-Marquardt minimisation algorithm, to determine the location and complex magnetic moment of a metal target within the surveillance volume. A difficulty is that there is no guarantee that a single use of such an algorithm will find the correct solution unless the starting point is close to the correct solution. It can converge to a local minimum instead of the global minimum.

One technique employed in the present metal object detecting apparatus to help find the correct solution is the use of a priori information relating to the way targets are known to enter and exit the surveillance volume. In a metal detecting portal, the points at which targets can enter and exit the surveillance volume are physically constrained by the sides of the portal housing the transmitter coils 34 and the receive coils 36. Hence, it is assumed that targets will come into the surveillance volume through the entrance to the portal, pass through the portal (and hence surveillance zone), and leave the surveillance zone at the exit of the portal.

Accordingly, the present metal detecting apparatus 30 solves this problem by first seeking the solution at one point on a track (e.g. its start point) by running the inversion algorithm 50 several times from a number of different, randomly chosen, starting points. The solution with the lowest residue is chosen as the best solution. This is then used as the starting point for the next point of the time series. If the solution was correct, this starting point is close to the correct solution, and is likely to converge again to the correct solution. If the solution was incorrect, the local minimum that was found is not stable as the target moves through the portal, and the correct solution is eventually found. Once the end of the track is reached the process is repeated in reverse and the tracks followed from the end back to the beginning, improving the early, incorrect points. A data collation algorithm 54 collates the results from the inversion algorithm 50 and orders the data to provide a track for each metal object through the surveillance volume comprising a plurality of locations of the metal object as a function of time, and a plurality of complex magnetic moments as a function of time, each magnetic moment corresponding with a location along the track. Each track thus consists of a time series of locations and a time series of corresponding complex magnetic moments.

An alternative strategy for tracking the location of metal objects as they pass through the surveillance volume is to record a time series of magnetic field measurements sensed by the receive coils 36 as the metal objects pass through the surveillance volume and subsequently to apply the inversion algorithm 50 to the recorded time series of magnetic field measurements in order to determine a plurality of locations and corresponding complex magnetic moments. The output using this alternative strategy is the same as that described above, namely a track for each metal object through the surveillance volume comprising a plurality of locations of the metal object as a function of time, and a plurality of complex magnetic moments as a function of time, each magnetic moment corresponding with a location along the track.

With regard to multiple targets, the processor 46 assumes a maximum number of targets (for example, four targets) for the first pass. At the end of this pass, targets that are too small are discarded and targets that are close together are merged. The return pass is carried out with a reduced number of targets The above procedure produces satisfactory solutions both for targets with the largest magnetic moments and for weaker ones (even though the weaker ones are often initially incorrect). Targets are followed with continuous tracks, so a separate tracking algorithm is not required.

Optionally, the metal detecting apparatus 30 comprises means for detecting movement 70, for example optical triggers, that record when a person enters and leaves the surveillance volume of the portal. This not only gives information on when a track begins and ends, but also on the direction of travel through the portal, which is not obvious a priori due to the rotational symmetry of the transmit coils 34.

Because of the rotational symmetry of the transmit and receive coils, a target with a magnetic polarizability tensor V located at (x, y, z) in the archway gives the same signals in the receive coils as a target located at (x, −y, −z) with a polarizability tensor (−V). Which of these is physically correct can be identified because the sign of the diagonal terms of the imaginary part of V is fixed by causality. This provides an additional or alternative technique to the movement detecting means for determining the direction of travel through the portal.

The processor 46 now applies an algorithm 58 to determine the magnetic polarizability tensor from the position dependent complex magnetic moment and position of each metal object passing through the portal. The eigenvalues of the magnetic polarizability tensor are calculated to determine an orientation independent signature of each metal object.

Once the tracks of the targets through the portal are determined, the applied fields at the targets are calculated from the known transmit coil geometry. Then the magnetic polarizability tensor V is extracted. For a target that does not rotate, the problem can be defined as being to minimise $$\sum_{i,j} w_i \left( \sum_k H_{ik} V_{kj} - m_{ij} \right)^2 \quad \text{(Equation 1)}$$

where the w's are weights which can be set to unity in a simple case. This is a linear least squares problem, and can be solved without iteration. There are 9 linear coefficients V to be found, or 6 if V is required to be symmetric (as has been shown by L D Landau and E M Lifschitz, "Electrodynamics of Continuous Media" Pergamon Press, 1960 p. 192 and L D Landau and E M Lifschitz, "Statistical Physics", Pergamon Press 1959, p. 404).

If the target rotates during the measurement, the problem becomes non-linear, and can be solved e.g. by the same Levenberg-Marquardt algorithm as was used for the inversion. The start point is well-approximated by the solution obtained by assuming a non-rotating target. Optionally, rotation is included to obtain accurate solutions for targets on the legs and the arms.

The result of this process is a complex matrix V which depends on the orientation of the target. To classify targets it is advantageous to transform V to a form which is independent of the target orientation. Much of the information about the target is contained in the eigenvalues of the real part of V and the imaginary part of V, treated as separate matrices. In general there is further information about the target in the angles between the eigenvectors of the real and imaginary parts of V. For many manufactured objects with symmetry one or all of the real eigenvectors are constrained to be parallel to the imaginary ones, so it is advantageous if the real and imaginary eigenvalues are paired in such a way as to minimise the angles between the corresponding eigenvectors.

In the frame of reference in which the real part of V is diagonal, the terms on the diagonal are positive for a ferromagnetic object and negative for a conducting object. The signs are functions of frequency for conducting objects which are also ferromagnetic.

A classification algorithm 62 is now applied to determine whether the detected metal objects match any previously characterised metal objects in a database; or belong to a particular class of metal object; the classes being derived from the database. A simple approach adopted in one embodiment of the present invention is to construct probability density models of the distributions of the complex eigenvalues. One way to use these density functions is in Bayes rule for minimum error. The initial classifier is a k-nearest neighbour classifier (A R Webb (2002). *Statistical Pattern Recognition*, second edition. John Wiley and Sons, Chichester).

Such a classification algorithm has been used in RF classification but has not hitherto been used for magnetic classification.

Applicant has determined that manufactured metal objects can be classified reliably into one of a plurality of broad classes of items using the apparatus and method of the present invention. For example, metal objects can be classified broadly into items which may present a security threat, termed threat items, and items which are unlikely to present a security threat, known as non-threat items. Furthermore, the present apparatus can classify objects into subclasses. For example, in the case of threat items, the metal object can be classified into one of number subclasses comprising knives, guns etc.

Applicant has further determined that at least in some circumstances manufactured metal objects can be positively identified using the apparatus and method of the present invention. Accordingly, not only can the metal object be classified into a class and subclass of objects, for example the subclass of guns within the broader class of threat items, but the item can also be positively identified based on its magnetic signature and specifically its complex polarizability tensor.

The abovementioned ability of the present metal object detecting apparatus to reliably classify and identify metal objects carried on the person provides several benefits in terms of the operational use of such a system. In particular, the present metal object detecting apparatus does not require a person to divest metal objects they are carrying prior to entering the surveillance volume. In the event that the metal object detector indicates the presence of a threat item carried by or on a person, the person may be asked by security personnel to divest the offending item(s), a process known as "self-divesting". By this process, security measures are maintained and intervention by security personnel is minimised. Hence, fewer security personnel are required with attendant cost savings.

The present metal object detecting apparatus optionally includes an imager 64, for example a video camera, a CCD device, a thermal imager etc. that records the images of people passing through the portal.

Where the metal object detecting apparatus comprises such imager 64, the system optionally also includes a user interface 66 having a display that shows the image from the imager 64 and superimposes the location of the metal objects detected on the person, and the results of the classification step.

An alarm 68 is optionally provided which provides a visual or audible warning in the event that any object detected within the portal falls within a predetermined class of objects or has a predetermined identity.

Specific embodiments of the transmitter coils 34 and the receive coils 36 shall now be described with reference to FIGS. 3 and 4.

The transmitter coils 34 and receive coils 36 are designed so that (to within the accuracy to which they can be built) the receive coils 36 detect no signal in the absence of a metal target. This is achieved by choosing the portal to have a certain symmetry and combining the outputs of symmetry related receive coils 36 either as sums or differences as appropriate.

The primary transmitted magnetic field is arranged, as a far as possible, to be finite everywhere in the surveillance volume of the portal, so that targets do not disappear. In addition the primary magnetic field is configured such that the resultant magnetic field direction twists in space as a target passes along any substantially linear track through the surveillance volume so that a target is illuminated with a significant field applied parallel to each of its principal axes at some point in the surveillance volume, irrespective of its orientation or the location of its track there-in.

Multi-polar magnetic fields have been used in prior art metal detecting apparatuses to ensure that metal objects within a transmitted magnetic field cannot escape detection, for example see U.S. Pat. No. 5,498,959, U.S. Pat. No. 5,121,105, and U.S. Pat. No. 4,605,898. This is a particular issue for a long thin ferromagnetic object like a knife or a needle, which respond much more strongly when the magnetic field is applied parallel to their length than when it is perpendicular to their length.

However, the use of a three-dimensional primary transmitted magnetic field which twists in space so that components thereof in three mutually orthogonal axes are all significant at some point along any straight track through said field and wherein each component of the primary transmitted field varies differently with position has not hitherto been used for the purposes of determining the magnetic signature of a metal object or a plurality of metal objects. Applicant's realisation that such magnetic field configuration is a necessary requirement for a static apparatus for detecting metal objects represents a key inventive feature of the present invention.

Figure 3:
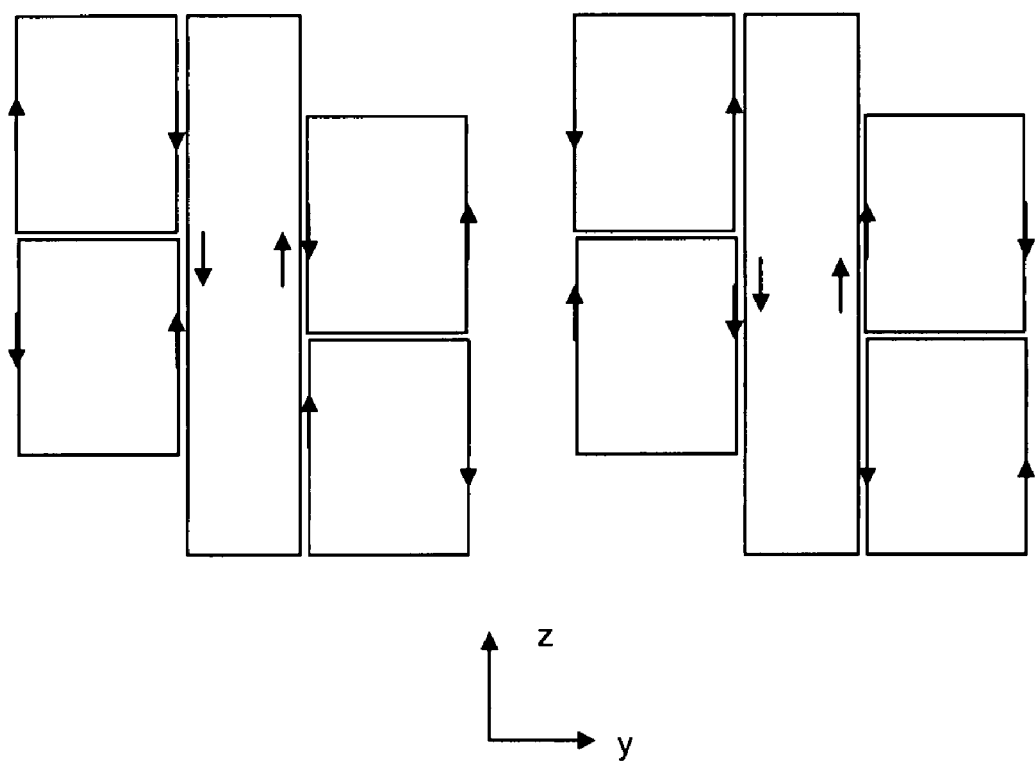
FIG. 3 shows a schematic illustration of the transmit coils of the metal object detecting apparatus of FIG. 2.

FIG. 3 shows an embodiment having a set of transmitter coils 34 which satisfy the above requirements. The z axis is vertical, the y-axis is the direction in which a subject passes through the archway, and the x-axis is in a direction substantially normal to the plane of the page. The portal is constructed from these by lifting one of the coil sets out of the plane of the paper and translating it to overlay on the other. Each coil set forms one wall of the portal. All the coils shown are designed to have the same number of turns and the same AC current flowing through them. The directions of the current flow at some instant are shown by the arrows.

The transmit coils 34 are arranged to have some symmetry, in this case two fold rotational symmetry. Under this symmetry operation, the components of the transmit magnetic field are either even or odd, that is to say, either they remain unchanged (even), or they change sign (odd). The field parallel to the axis of rotation is even, and the fields perpendicular to the rotation axis are odd.

For this arrangement of coils, the field has rotational symmetry about the x-axis. If the origin is chosen at the centre of the archway, the magnetic field at a point $(x, y, z)$ is related to the field at a point $(x, -y, -z)$. If the field at $(x, y, z)$ is the vector $(H_x, H_y, H_z)$ then the field at $(x, -y, -z)$ is $(H_x, -H_y, -H_z)$.

Figure 4A:
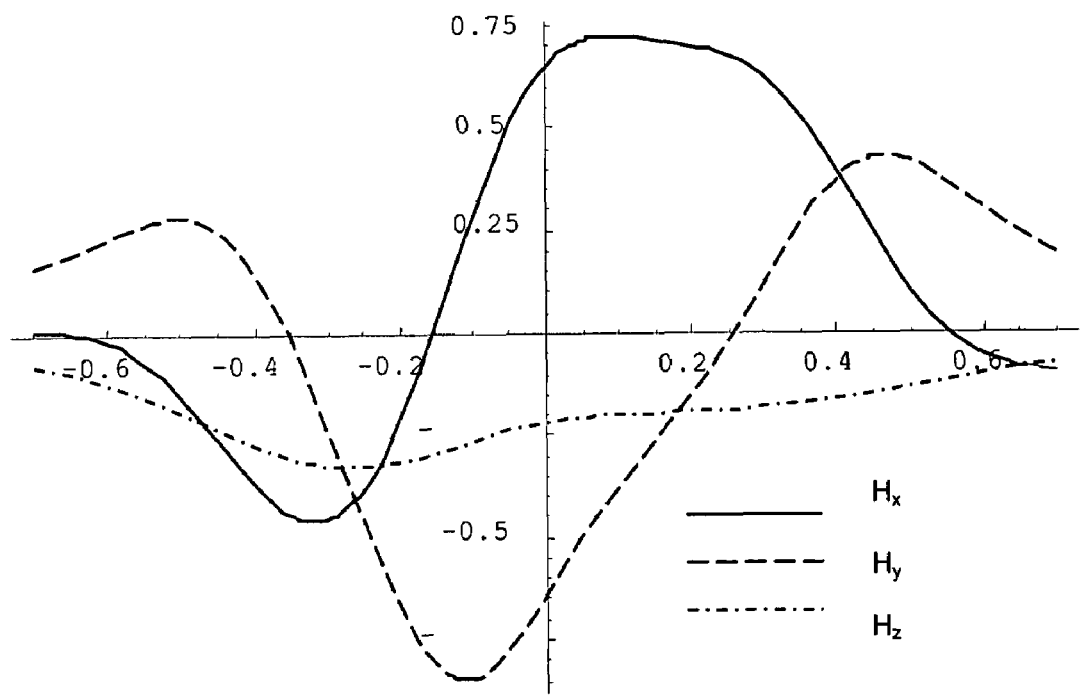
FIGS. 4a and 4b show graphs of the magnetic field $H_x$, $H_y$ and $H_z$ within the surveillance volume of a metal object detecting apparatus comprising the transmit coils of FIG. 3. The horizontal axes represent the location in the y direction.
Figure 4B:
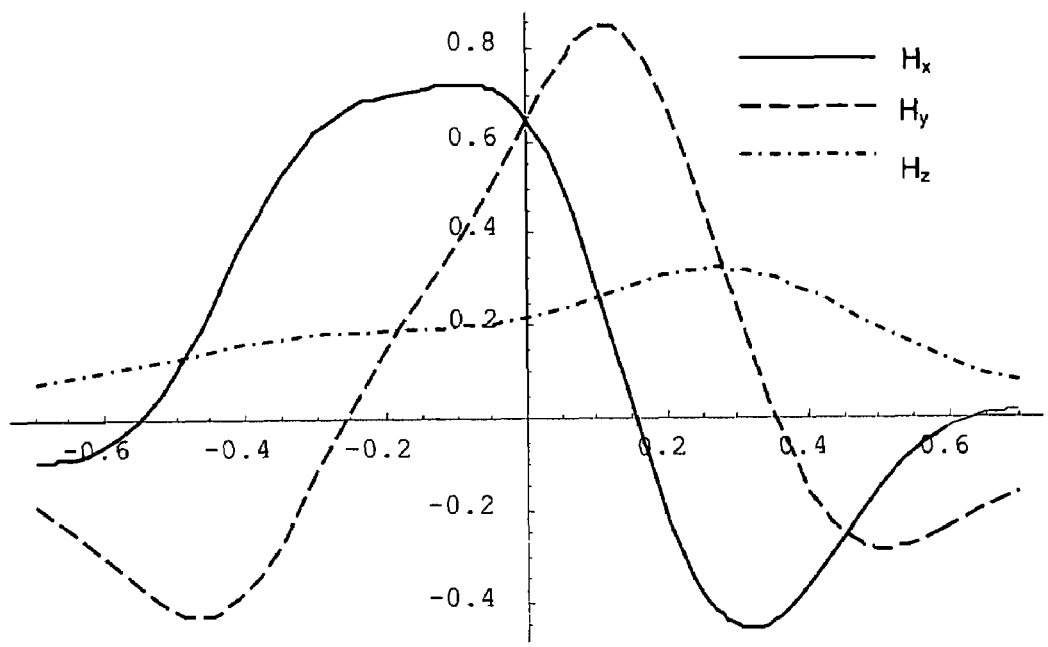

By way of illustration of the magnetic field transmitted by the transmit coils 34, FIGS. 4a and 4b show graphs of the magnetic field $H_x$, $H_y$ and $H_z$ (in arbitrary units) within the surveillance volume of a portal comprising the present metal object detecting apparatus. The horizontal axis is position as one walks through the archway. FIG. 4a represents the magnetic field for a path through the portal archway at a height of ¾ of the total archway height, whereas FIG. 4b represents the magnetic field for a path through the portal archway at a height of ¼ of the total portal archway height. The tracks are both displaced from one side of the portal archway by 0.3 of the archway width.

Typically, an optimised design for a portal archway 2.5 m high, 0.8 m wide and 0.8 m long has a central coils 2.5 m×0.222 m. The outer coils are 1 m×0.288 m. Without limitation, all the coils have the same number of turns and are excited by the same current.

Referring now to the receive coils 34 within the metal object detecting apparatus, said receive coils 36 are arranged to have the same symmetry as the transmit coils 34. By connecting together two receive coils that are related by symmetry, the receive coils can be arranged so that they do not detect the transmit field. Coils that sense a field direction which is even under the symmetry operation need to be connected together to subtract and coils that sense a field direction that is odd under the symmetry operation need to be connected together to add.

In the case of the transmitter coils 34 having the above-mentioned configuration, the receive coils 36 are configured to exhibit twofold rotational symmetry about the horizontal axis running transverse to the archway (x-axis). The y-axis is through the archway (the direction in which one walks) and the z-axis is vertical. The arrangement of the receive coils may be different depending one whether there is an odd or even number of coils parallel to the z-direction.

One embodiment of the receive coils 36 is shown in FIG. 5. In this layout, the receive coils 36 are configured in a receive coil array; each block within the array represents a cuboid (cuboid$_{1,1}$ to cuboid$_{9,3}$) on which are wound three coils, normal to the x, y and z directions respectively. Each coil is connected in series with the one that it is related to by symmetry. Thus the coils on cuboid (1,1) are each connected to the equivalent one on cuboid (9,3). Those on (5,1) are connected to those on (5,3). The coils normal to the x-axis are connected together to measure the differences in the fields between them. The coils normal to the y-axis and the z-axis are connected together to measure the sums of their fields. Then the emf induced in the two coils of each pair due to the primary transmitted field are equal and opposite, so that the primary transmitted field is not detected, and only the field due to a target is detected.

The central cell (5,2) is on the symmetry axis and is not connected to any other coil, as coils normal to the y and z axes do not detect the transmit field by symmetry. A block like this only exists if the number of rows and the number of columns within the receive coil array are both odd.

In an alternative embodiment, the receive coil array comprises only coils oriented with their normals parallel to the y-axis. This can be achieved by dividing each block in the configuration shown in FIG. 4 into four areas. This results in a portal with much thinner archway walls, and which is less susceptible to interference.

Each block within the receive coil array has been referred to in the foregoing with respect to "cuboids" for convenience. However, other configurations of the receive coils 36 within the receive coil array may be employed which reuse the same volume and are dimensionally stable.

The invention is described with reference to the use of magnetic receive coils. However, any magnetic sensing means may be used to measure the magnetic field components. For example, fluxgates, magneto-resistive devices, magneto-impedance devices, and Hall effect sensors may be used to measure each of the field components required to fully characterise the field.

Although the present invention has been described with regard to the detection, location and characterisation of conducting or magnetic objects carried on or within a person, similar methods can evidently be applied to performing the same function in any situation where objects can be made to pass though a sensing region.

In view of the foregoing description it will be evident to a person skilled in the art that various modifications may be made within the scope of the invention.

The scope of the present disclosure includes any novel feature or combination of features disclosed therein either explicitly or implicitly or any generalisation thereof irrespective of whether or not it relates to the claimed invention or mitigates any or all of the problems addressed by the present invention. The applicant hereby gives notice that new claims may be formulated to such features during the prosecution of this application or of any such further application derived there from. In particular, with reference to the appended claims, features from dependent claims may be combined with those of the independent claims and features from respective independent claims may be combined in any appropriate manner and not merely in the specific combinations enumerated in the claims.

The invention claimed is:

1. A metal object detecting apparatus comprising,
   (i) a transmitter for generating a time varying primary magnetic field within a surveillance volume, the magnetic field having a non-zero magnitude throughout substantially all of the surveillance volume and a resultant magnetic field direction which varies along any substantially linear path through the surveillance volume such that at three locations along said path the resultant magnetic field points in three mutually substantially orthogonal directions,
   (ii) a detector for measuring a secondary magnetic field at a plurality of positions as a function of time due to the presence of a metal object within the surveillance volume as it passes a plurality of measurement points therethrough, the detector being arranged to substantially reject the primary magnetic field, and
   (iii) a processor for determining from the measured secondary magnetic fields a track through the surveillance volume comprising a plurality of locations of the metal object within the surveillance volume and a magnetic moment thereof at each location, the processor being adapted in use to derive there-from a magnetic signature that is characteristic of the metal object and independent of the orientation and track of the metal object through the surveillance volume.

2. A metal object detecting apparatus according to claim 1 wherein the processor is adapted in use to classify the metal object into one of a plurality of classes of metal objects based on said magnetic signature thereof.

3. A metal object detecting apparatus according to claim 1 wherein the processor is adapted in use to identify the metal object from said magnetic signature thereof.

4. A metal object detecting apparatus according to claim 1 wherein in use the processor determines the track of the metal object through the surveillance volume by applying a minimisation algorithm to the secondary magnetic fields measured by the detector.

5. A metal object detecting apparatus according to claim 1 wherein the processor applies the minimisation algorithm to the secondary magnetic field measurements for each measurement point in sequence to provide the location of the metal object in three-dimensions and the magnetic moment there-at, and orders said locations and magnetic moments to give the track of the metal object and the magnetic moment as a function of position along the track.

6. A metal object detecting apparatus according to claim 1 wherein the processor stores the secondary magnetic field measurements for each measurement point, subsequently applies the minimisation algorithm to the stored secondary magnetic field measurements to provide the location of the metal object in three-dimensions and the magnetic moment there-at, and orders said locations and magnetic moments to give the track of the metal object and the magnetic moment as a function of position along the track.

7. A metal object detecting apparatus according to claim 1 wherein, in use, the processor calculates the magnetic polarizability tensor for the metal object from the magnetic moment determined at each location along the track through the surveillance volume.

8. A metal object detecting apparatus according to claim 7 wherein, in use, the processor calculates eigenvalues of the magnetic polarizability tensor for the metal object.

9. A metal object detecting apparatus according to claim 8 wherein, in use, the processor compares the eigenvalues calculated for the metal object to a database comprising eigenvalues of a plurality of objects arranged into a plurality of predetermined classes, so as to classify the metal object into one of said plurality of predetermined classes of objects.

10. A metal object detecting apparatus according to claim 9 wherein, in use, the processor produces a classification output indicative of a class of objects to which the metal object belongs in the event that the calculated eigenvalue substantially matches an eigenvalue within the database.

11. A metal object detecting apparatus according to claim 8 wherein, in use, the processor compares the eigenvalues calculated for the metal object to a database comprising eigenvalues of a plurality of objects and associated identities there-of, so as to identify the metal object from the calculated eigenvalue.

12. A metal object detecting apparatus according to claim 11 wherein, in use, the processor produces an identification output indicative of the identity of the metal object in the event that the calculated eigenvalue substantially matches an eigenvalue within the database.

13. A metal object detecting apparatus according to claim 1 wherein the transmitter comprises at least one transmitter coil array having a plurality of transmitter coils arranged symmetrically therein.

14. A metal object detecting apparatus according to claim 13 wherein the transmitter coil array has twofold rotational symmetry about a central axis thereof.

15. A metal object detecting apparatus according to claim 13 wherein the at least one transmitter coil array comprises a plurality of substantially rectangular coils disposed in a regular arrangement with neighbouring sides of adjacent coils being substantially parallel.

16. A metal object detecting apparatus according to claim 1 wherein the detector comprises at least one detector array having a plurality of magnetic sensors, each magnetic sensor having a measurement axis sensitive to a vector component of the secondary magnetic along said measurement axis.

17. A metal object detecting apparatus according to claim 16 wherein each of the magnetic sensors is arranged within the at least one detector array with its measurement axis aligned in one of three mutually substantially orthogonal directions.

18. A metal object detecting apparatus according to claim 16 wherein the magnetic sensors are orientated such that their measurement axis is perpendicular to the primary magnetic field.

19. A metal object detecting apparatus according to claim 16 wherein the magnetic sensors comprise a plurality of coil pairs, the coils comprising each coil pair being connected together electrically and arranged symmetrically each with respect to the other within the at least one detector array.

20. A metal object detecting apparatus according to claim 19, the transmitter comprising at least one transmitter coil array having a plurality of transmitter coils arranged symmetrically therein, wherein the coils comprising each coil pair are arranged each with respect to the other within the detector array with the same symmetry as that with which the plurality of transmitter coils are arranged within the transmitter coil array.

21. A metal object detecting apparatus according to claim 19, the transmitter comprising at least one transmitter coil array having twofold rotational symmetry about a central axis thereof and a plurality of transmitter coils arranged symmetrically therein, wherein the detector array has twofold rotational symmetry about a central axis thereof.

22. A metal object detecting apparatus according to claim 21 wherein the transmitter coil array and the detector array have a common axis of rotational symmetry.

23. A metal object detecting apparatus according to claim 19 wherein the coils comprising each coil pair are connected together electrically in series with the opposite polarity or the same polarity so as to be substantially insensitive to the primary magnetic field.

24. A metal detecting apparatus according to claim 23 wherein, in use, a correction is applied to an output of the detector such that said output is substantially zero in the absence of a metal object within the surveillance volume.

25. A metal object detecting apparatus according to claim 1 adapted in use to separate the real and imaginary components of the measured secondary magnetic fields with respect to the phase of the primary magnetic field.

26. A metal object detecting apparatus according to claim 1 comprising an imager arranged in use to provide an image of the surveillance volume including any occupant there-of.

27. A metal object detecting apparatus according to claim 26 including a display device configured to display a composite image comprising the image of the surveillance volume and the location of the metal object or objects within the surveillance volume, so as to provide a visual indication of the location of the metal object with respect to any occupant of the surveillance volume.

28. A metal object detecting apparatus according to claim 2 comprising an indicator for indicating the class within which the metal object has been classified.

29. A metal object detecting apparatus according to claim 1 wherein the processor is capable of determining from the measured secondary magnetic fields the track of each of a plurality of metal objects passing simultaneously through the surveillance volume.

30. A metal object detecting apparatus according to claim 29 adapted to classify a plurality of metal objects substantially simultaneously.

31. A metal object detecting apparatus according to claim 29 adapted to identify a plurality of metal objects substantially simultaneously.

32. A metal object detecting portal comprising a metal detecting apparatus according to claim 1.

33. A method of detecting a metal object within a surveillance volume comprising the steps of:
   (i) generating a time varying primary magnetic field within the surveillance volume, the magnetic field being arranged to have a non-zero magnitude throughout substantially all of the surveillance volume and a resultant magnetic field direction which varies along any substantially linear path through the surveillance volume such that at three locations along said path the resultant magnetic field points in three mutually substantially orthogonal directions,
   (ii) measuring a secondary magnetic field at a plurality of positions as a function of time due to the presence of a metal object within the surveillance volume as it passes a plurality of measurement points there-through,
   (iii) determining from the measured secondary magnetic fields a track through the surveillance volume comprising a plurality of locations of the metal object within the surveillance volume and a magnetic moment thereof at each location,
   (iv) deriving from the plurality of locations of the metal object within the surveillance volume and the magnetic moment thereof at each location a magnetic signature that is characteristic of the metal object and independent of the orientation and track of the metal object through the surveillance volume.

34. A method according to claim 33 comprising the further step of classifying the metal object into one of a plurality of classes of metal objects based on said magnetic signature thereof.

35. A method according to claim 33 comprising the further step of identifying the metal object from said magnetic signature thereof.

36. A method according to claim 33 wherein the step of determining the track of the metal object through the surveillance volume comprises the step of applying a minimisation algorithm to the measured secondary magnetic fields.

37. A method according to claim 36 wherein the minimisation algorithm is applied to the secondary magnetic field measurements for each measurement point in sequence to provide the location of the metal object in three-dimensions and the magnetic moment there-at, and said locations and magnetic moments are ordered to give the track of the metal object and the magnetic moment as a function of position along the track.

38. A method according to claim 36 wherein the secondary magnetic field measurements for each measurement point are stored, the minimisation algorithm is subsequently applied to the stored secondary magnetic field measurements to provide the location of the metal object in three-dimensions and the magnetic moment there-at, and said locations and magnetic moments are ordered to give the track of the metal object and the magnetic moment as a function of position along the track.

39. A method according to claim 33 comprising the step of calculating the magnetic polarizability tensor for the metal object from the magnetic moment determined at each location along the track through the surveillance volume.

40. A method according to claim 39 comprising the step of calculating eigenvalues of the magnetic polarizability tensor for the metal object.

41. A method according to claim 40 comprising the step of comparing the eigenvalues calculated for the metal object to a database comprising eigenvalues of a plurality of objects arranged into a plurality of predetermined classes, so as to classify the metal object into one of said plurality of predetermined classes of objects.

42. A method according to claim 41 comprising the step of producing a classification output indicative of a class of objects to which the metal object belongs in the event that the calculated eigenvalue substantially matches an eigenvalue within the database.

43. A method according to claim 40 comprising the step of comparing the eigenvalues calculated for the metal object to a database comprising eigenvalues of a plurality of objects and associated identities there-of, so as to identify the metal object from the calculated eigenvalue.

44. A method according to claim 43 comprising the step of producing an identification output indicative of the identity of the metal object in the event that the calculated eigenvalue substantially matches an eigenvalue within the database.

45. A method according to claim 33 comprising the step of separating the real and imaginary components of the measured secondary magnetic fields with respect to the phase of the primary magnetic field.

46. A method according to claim 33 comprising the further step of taking an image of the surveillance volume including any occupant there-of.

47. A method according to claim 46 comprising the step of displaying a composite image comprising the image of the surveillance volume and the location of the metal object or objects within the surveillance volume, so as to provide a visual indication of the location of the metal object with respect to any occupant of the surveillance volume.

48. A method according to claim 33 comprising the step of determining from the measured secondary magnetic fields the track of each of a plurality of metal objects passing simultaneously through the surveillance volume.

49. A method according to claim 48 comprising the step of classifying a plurality of metal objects substantially simultaneously.

50. A method according to claim 48 comprising the step of identifying a plurality of metal objects substantially simultaneously.

* * * * *

UNITED STATES PATENT AND TRADEMARK OFFICE
CERTIFICATE OF CORRECTION

PATENT NO.         : 7,545,140 B2                                      Page 1 of 1
APPLICATION NO. : 11/808919
DATED              : June 9, 2009
INVENTOR(S)        : Humphreys et al.

It is certified that error appears in the above-identified patent and that said Letters Patent is hereby corrected as shown below:

The title page item (60) should include the following:

Related U.S. Application Data

(60) Provisional application No. 60/841,563, filed on Sep. 1, 2006.

Signed and Sealed this

First Day of September, 2009

David J. Kappos
*Director of the United States Patent and Trademark Office*